2,994,395
BATTERY CLAMP
Theodore W. Hall, 18026 Wisconsin, Detroit, Mich.
Filed Dec. 5, 1958, Ser. No. 778,378
3 Claims. (Cl. 180—68.5)

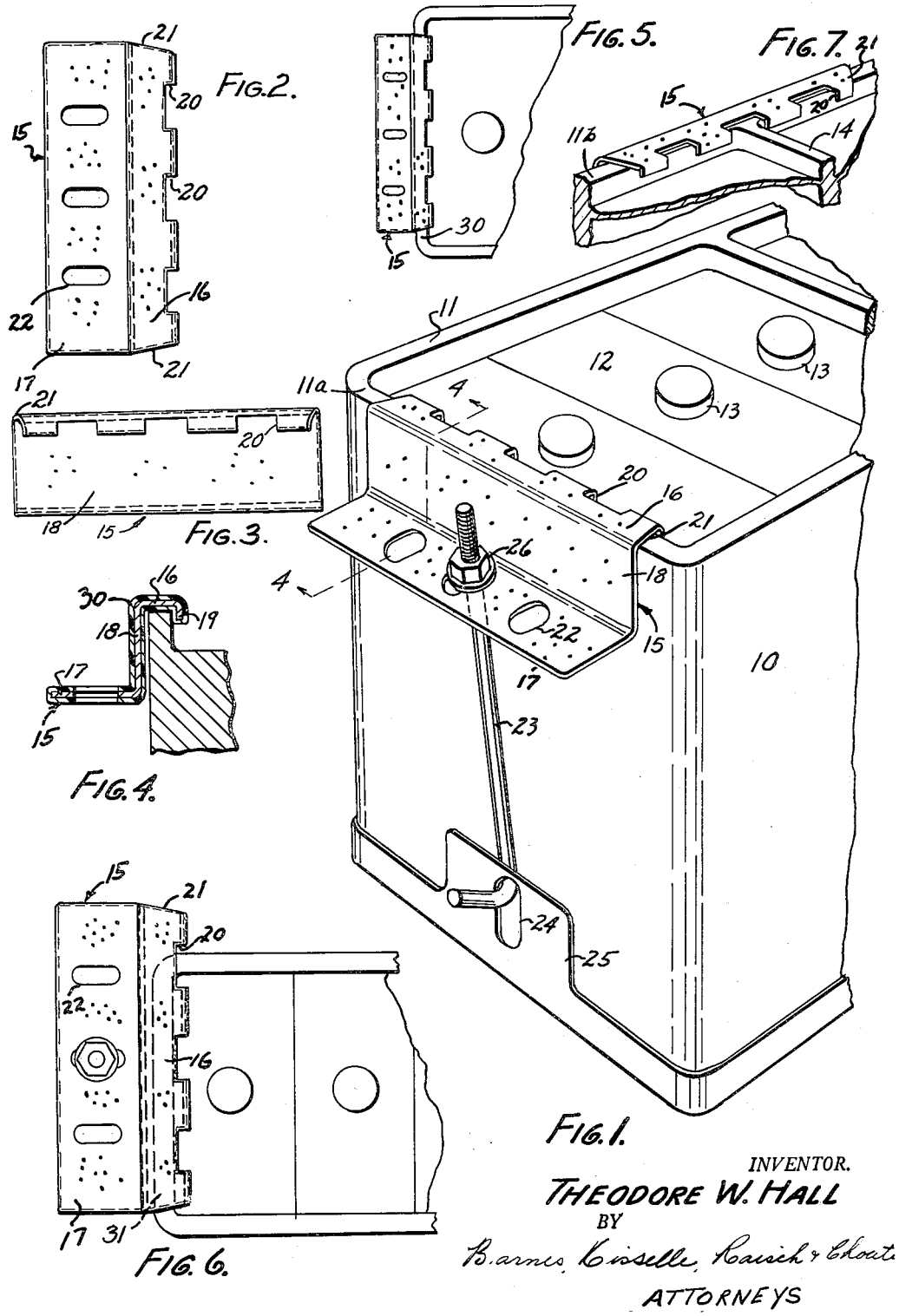

This invention relates to battery clamps for holding down vehicle batteries.

In order to hold down a vehicle battery and prevent it from moving relative to the vehicle, it is customary to provide a clamp which usually has the same shape as the upper end of the battery and is adapted to engage the upper end of the battery. J-bolts are usually mounted on the vehicle frame and extend upwardly through openings in the clamp and are fastened to the clamp. In addition to requiring a great deal of fabrication because of the intricate shape, such clamps also offer a major problem to the retailer who is replacing a battery. Since such clamps corrode very easily, it has been found necessary for the retailer to carry a large stock of the clamps in order to accommodate the various sizes of battery.

It is an object of this invention to provide novel battery clamps for holding down vehicle batteries which can be used to hold down batteries of various sizes.

It is a further object of this invention to provide such battery clamps which are protected from corrosion.

In the drawings:

FIG. 1 is a fragmentary perspective view of a battery held in position by battery hold down clamps embodying the invention.

FIG. 2 is a plan view of the battery hold down clamp.

FIG. 3 is a side view of the clamp.

FIG. 4 is a fragmentary sectional view taken along the line 4—4 in FIG. 1.

FIG. 5 is a fragmentary plan view showing the clamp in position on a battery of different size.

FIG. 6 is a fragmentary plan view showing the clamp in position on a battery of still different size.

FIG. 7 is a fragmentary perspective view showing the clamp in a different position on a battery.

As shown in FIG. 1, a battery 10 for a vehicle of conventional construction comprises a casing which is generally rectangular and includes an upwardly extending peripheral wall 11 above the surface of the top wall 12 which contains the filler openings 13. In addition, such a battery conventionally includes transverse ribs or walls 14 at longitudinally spaced points along the length of the battery.

According to the invention, novel battery clamps are provided which are adapted to engage diametrically opposed portions of the wall 11. As shown in FIGS. 2, 3 and 4, clamp 15 is generally Z-shaped in construction and includes a top flange 16, a bottom flange 17 which is generally parallel to top flange 16 and an intermediate section 18 which is at a generally right angle to the top and bottom flanges 16, 17. A lip 19 is provided along the side edge of top flange 16 and extends in the direction of intermediate section 18 and generally parallel thereto. Notches 20 are provided at spaced points in the lip 19 and extend upwardly into the flange. The end edges 21 of the flange 16 are tapered inwardly for reasons presently described. Elongated openings 22 are provided at spaced points along the flange 17 and are adapted to receive a J-bolt 23 which has its lower end extending through an opening 24 in a bracket 25 fixed to the vehicle and its upper end extending into one of the openings 22. A nut 26 threaded on the J-bolt 23 is tightened to hold the clamp in position with the U-shaped channel formed by the flange 16, lip 19 and section 18 engaging the upper end of the wall 11. The width of the flange 16 is substantially equal to or slightly greater than the width of the wall 11 (FIG. 4).

The provision of the notches 20 in the lip 19 permits the same clamp to be used on batteries of different dimensions. For example, as shown in FIG. 1, the clamp engages the end portion 11a of wall 11 to hold down a battery which is substantially wider than the length of the clamp.

As shown in FIG. 5 the clamp is used to hold down a battery which is substantially the same width as the length of the clamp, the tapered edges 21 permitting the clamp to engage the wall 30.

In FIG. 6 where the battery is of less width than the length of the clamp, the clamp may be used to engage the wall 31 with a portion of the wall extending upwardly into one of the notches 20. Similarly, the clamp may be used to engage the side portion 11b of wall 11 of a battery where it is required (FIG. 7).

Each clamp 15 is provided with an acid resistant coating 30 such as rubber or plastic. This coating may be applied in any suitable manner such as dipping, spraying or the like.

It can be seen that the clamp embodying the invention not only provides a ready means for holding down a vehicle battery, but in addition, provides a clamp which because of the plastic coating is resistant to corrosion. It is only necessary to maintain one size of clamp in stock, thus, eliminating a great inventory and providing a low cost clamp.

It may be found desirable to provide two series of clamps having different flange widths in order to insure that both 6 and 12 volt batteries can be clamped.

I claim:

1. A battery clamp for holding down a vehicle battery of the type having a vertically extending peripheral wall, said clamp comprising a member which is generally Z-shaped in cross section and has a top flange, a bottom flange generally parallel to the top flange and an intermediate section at a right angle to the top and bottom flanges, a lip extending along the side edge of said top flange, said lip being formed with a plurality of notches throughout its length thereby forming openings, said notches extending partially into said top flange whereby said clamp may be used to hold down a battery having a width less than the length of said member, with at least one portion of the vertically extending peripheral wall of said battery extending upwardly into a notch in said member.

2. A battery clamp for holding down a vehicle battery of the type having a vertically extending peripheral wall, said clamp comprising a member which is generally Z-shaped in cross section and has a top flange, a bottom flange generally parallel to the top flange and an intermediate section at a right angle to the top and bottom flanges, a lip extending along the side edge of said top flange, said lip being formed with a plurality of notches throughout its length, said notches extending partially into said top flange, and a thick coating of acid resisting plastic material covering said member, whereby said clamp may be used to hold down a battery having a width less than the length of said member, with at least one portion of the vertically extending peripheral wall extending upwardly into a notch in said member.

3. A battery clamp for holding down a vehicle battery of the type having a vertically extending peripheral wall, said clamp comprising a unitary member which is generally Z-shaped in cross section and includes a top flange, a bottom flange generally parallel to the top flange and an intermediate section at a right angle to the top and bottom flanges, an integral lip extending along the free side edge of said top flange downwardly therefrom, said lip being formed with a plurality of notches throughout its length, each said notch extending upwardly throughout the height of said lip, said bottom flange having a plurality of longitudinally spaced openings therein adapted to receive selectively the end of a J-bolt, each said opening being elongated in a direction transverse of the length of said bottom flange, whereby said clamp may be used to hold down a battery having a width less than the length of said member, with at least one portion of the vertically extending peripheral wall of said battery extending upwardly into a notch in said member and a J-bolt extending through one of the openings in said bottom flange of said member.

References Cited in the file of this patent

UNITED STATES PATENTS

| | | |
|---|---|---|
| 600,506 | Blake et al. | Mar. 15, 1898 |
| 1,636,562 | Hick | July 19, 1927 |
| 2,094,329 | Moscuch | Sept. 28, 1937 |
| 2,849,074 | Key et al. | Aug. 26, 1958 |

FOREIGN PATENTS

| | | |
|---|---|---|
| 420,735 | Great Britain | Dec. 6, 1934 |
| 729,567 | Great Britain | May 11, 1955 |